(12) United States Patent
Bossan

(10) Patent No.: US 9,962,643 B2
(45) Date of Patent: May 8, 2018

(54) REGENERATIVE METHOD FOR REMOVING SILOXANE COMPOUNDS FROM BIOGAS

(71) Applicant: AROL ENERGY, Le Bouget du Lac (FR)

(72) Inventor: David Bossan, Seyssel (FR)

(73) Assignee: AROL ENERGY, Le Bourget du Lac (FR)

( * ) Notice: Subject to any disclaimer, the term of this patent is extended or adjusted under 35 U.S.C. 154(b) by 66 days.

(21) Appl. No.: 14/916,880

(22) PCT Filed: Sep. 12, 2014

(86) PCT No.: PCT/FR2014/052266
§ 371 (c)(1),
(2) Date: Mar. 4, 2016

(87) PCT Pub. No.: WO2015/036711
PCT Pub. Date: Mar. 19, 2015

(65) Prior Publication Data
US 2016/0206990 A1    Jul. 21, 2016

(30) Foreign Application Priority Data

Sep. 13, 2013   (FR) ...................................... 13 58865

(51) Int. Cl.
*B01D 53/04* (2006.01)

(52) U.S. Cl.
CPC ......... *B01D 53/0454* (2013.01); *B01D 53/04* (2013.01); *B01D 53/0438* (2013.01);
(Continued)

(58) Field of Classification Search
CPC ............... B01D 53/04; B01D 53/0438; B01D 53/0454; B01D 2253/102; B01D 2253/34;
(Continued)

(56) References Cited

U.S. PATENT DOCUMENTS 5,004,511 A * 4/1991 Tamura .............. B01D 39/2065
156/242
5,899,187 A * 5/1999 Gruber ................... B01D 53/04
123/1 A
(Continued)

FOREIGN PATENT DOCUMENTS

DE           19828593 A1   10/1999
EP            0818617 A1    1/1998
JP          H06-142432 A    5/1994

OTHER PUBLICATIONS

Dec. 1, 2014, Search Report issued in International Patent Application No. PCT/FR2014/052266.
(Continued)

*Primary Examiner* — Frank Lawrence
(74) *Attorney, Agent, or Firm* — Oliff PLC

(57) ABSTRACT

A method for treating a biogas containing siloxanes, includes: firstly, filtering the siloxane-containing biogas with a filter made from activated carbon fabric, such as to adsorb the siloxanes in the filter; and, secondly, regenerating the filter by passing an electric current through the filter while it is subjected to a flushing gas flow. A device carries out the method.

18 Claims, 2 Drawing Sheets

(52) U.S. Cl.
CPC .... *B01D 2253/102* (2013.01); *B01D 2253/34* (2013.01); *B01D 2256/245* (2013.01); *B01D 2257/55* (2013.01); *B01D 2258/05* (2013.01); *B01D 2259/40096* (2013.01)

(58) Field of Classification Search
CPC .......... B01D 2256/245; B01D 2257/55; B01D 2258/05; B01D 2259/40096
USPC .................. 95/8, 11, 14, 114, 115, 141, 148; 96/111, 112, 121, 130, 143
See application file for complete search history.

(56) References Cited

U.S. PATENT DOCUMENTS

| | | | |
|---|---|---|---|
| 5,912,423 A | 6/1999 | Doughty et al. | |
| 6,364,936 B1 * | 4/2002 | Rood | B01D 53/0438 95/115 |
| 9,023,755 B2 * | 5/2015 | Herrera | B01D 53/02 502/417 |
| 2006/0000352 A1 * | 1/2006 | Tower | B01D 53/02 95/8 |
| 2006/0096454 A1 * | 5/2006 | Farant | B01D 53/02 95/148 |
| 2007/0068386 A1 * | 3/2007 | Mitariten | B01D 53/04 95/116 |
| 2009/0293725 A1 * | 12/2009 | Rood | B01D 53/0454 96/112 |
| 2014/0366726 A1 * | 12/2014 | Mitariten | B01D 53/0462 95/141 |

OTHER PUBLICATIONS

Dec. 1, 2014, Written Opinion issued in International Patent Application No. PCT/FR2014/052266.

\* cited by examiner

REGENERATIVE METHOD FOR REMOVING SILOXANE COMPOUNDS FROM BIOGAS

FIELD OF THE INVENTION

The present invention lies in the context of the purification of biogas. More specifically, this invention relates to a method and device for eliminating siloxane compounds from biogas.

TECHNOLOGICAL BACKGROUND

Biogas is a combustible gas obtained by fermentation, also referred to as methanisation, of organic waste of animal or plant origin in the absence of oxygen. It is mainly composed of methane and carbon dioxide. It also conventionally contains a little nitrogen, very little oxygen, water vapour, hydrogen sulphide ($H_2S$) and numerous other substances in very small quantities, in particular volatile organic compounds (VOCs), polycyclic aromatic hydrocarbons (PAHs), halogenated compounds, heavy metals and siloxanes. The nature and concentration of these substances vary in particular according to the methanisation method and the nature of the methanised material.

Biogas may be used as a fuel in replacement for natural gas. However, according to the uses sought, it may be necessary to purify the biogas in order to eliminate certain contaminating substances therefrom. For example, in the case of the use of biogas as an engine fuel, it is necessary to eliminate the siloxane compounds since, oxidised at high temperatures, siloxanes form deposits of silica that may seriously damage the equipment.

The purification of biogas is generally carried out by means of filters that capture the undesirable compounds through an adsorption phenomenon. When the material of the filters is saturated, the worn filters are replaced by new ones, with the economic and ecological consequences that result therefrom. Currently, the so-called regenerative solutions, that is to say methods in which the worn filters are regenerated and reused, are few in number.

The American patent application US 2013/0137567 presents a method for eliminating siloxanes in biogas by means of a regeneratable adsorbent material. The regeneratable material used is activated carbon in the form of granules disposed inside a tubular chamber with a rectangular cross section formed by two electrodes and two dielectric elements disposed respectively face to face. When the activated carbon is saturated with contaminant, it can be regenerated by passing an electric current between the two electrodes of the device. This technical solution does however pose a problem with regard to the maintenance of the electrical contact between the two electrodes: if the contact between the grains of activated carbon is too small, the electrical resistance of the regeneratable material becomes too high and the electric current no longer flows correctly. To remedy this problem, this American patent application US 2013/0137567 proposes installing a vibrating element intended to homogenise the contacts between the activated carbon granules. This solution is however not optimum: the presence of this vibrating element makes the device more complex, more expensive to manufacture, and difficult to reproduce on a large installation. Furthermore, even homogenised by means of the vibrating element, the regeneratable material consisting of activated carbon in the form of granules has high electrical resistance, which means that the electrical power necessary for obtaining sufficient regeneration is high.

One of the objectives of the present invention is to propose a novel regenerative method for eliminating siloxanes from a biogas that is more effective than those of the prior art.

Other regenerative methods for adsorbin, contaminants in gaseous streams have been described in the prior art. Mention can be made in particular of those described in the American patent application US 2006/0096454 and the European patent application EP 1 170 050. These documents describe the use of activated carbon in the form of a cloth as the adsorbent material able to be regenerated by applying an electric current. However, the contaminating compounds the adsorption of which is sought in these documents are essentially the residues of solvents such as toluene present in the ambient air, There is no question of the capture of siloxane compounds in a biogas. However, the adsorption and regeneration properties of an adsorbent material depend to a major extent on the nature of the compound adsorbed, its concentration and the nature and concentration of the other chemical species in the gas containing the contaminating compound. Furthermore, in these two documents, it should be noted that the regeneration step during which an electric current is applied in the adsorbent material is performed in the absence of a flushing stream.

There therefore remains the need to propose a simple and inexpensive method for eliminating siloxanes from a biogas and then regenerating the adsorbent material. Advantageously, it is wished for the adsorption of the siloxanes to be high but for the regeneration of the adsorbent material to consume as little energy as possible. In addition, it is wished for the adsorption capacity of the material to be maintained as high as possible during the adsorption/desorption cycles.

BRIEF DESCRIPTION OF THE INVENTION

The applicant has discovered that this need could be satisfied by using a method for eliminating the siloxanes contained in a biogas by adsorption on an activated-carbon cloth and then the thermoelectrical regeneration of this activated-carbon cloth.

The subject matter of the present invention is thus a method for treating a biogas containing siloxanes, comprising the steps consisting of:

a) filtering a flow of biogas containing siloxanes with a filter made from activated-carbon cloth so as to adsorb the siloxanes in said filer, then b1) regenerating said filter by circulating an electric current in said filter subjected to a gaseous flushing stream, then b2) optionally destroying said flushing gas thermally.

Another subject matter of the invention is a device intended for implementing the method described above. This device for treating a biogas containing siloxanes comprises:

- a filtration chamber provided with at least a first orifice allowing entry of gas and at least a second orifice allowing the discharge of gas;
- a filter made from activated-carbon cloth placed in said filtration chamber and connected to two electrodes;
- a means for circulating an electric current in said filter made from activated-carbon cloth connected to said two electrodes;
- a means for injecting flushing gas into the filtration chamber, and optionally a means for destroying the flushing gas emerging from the filtration chamber.

DETAILED DESCRIPTION OF THE INVENTION

Figure 1:
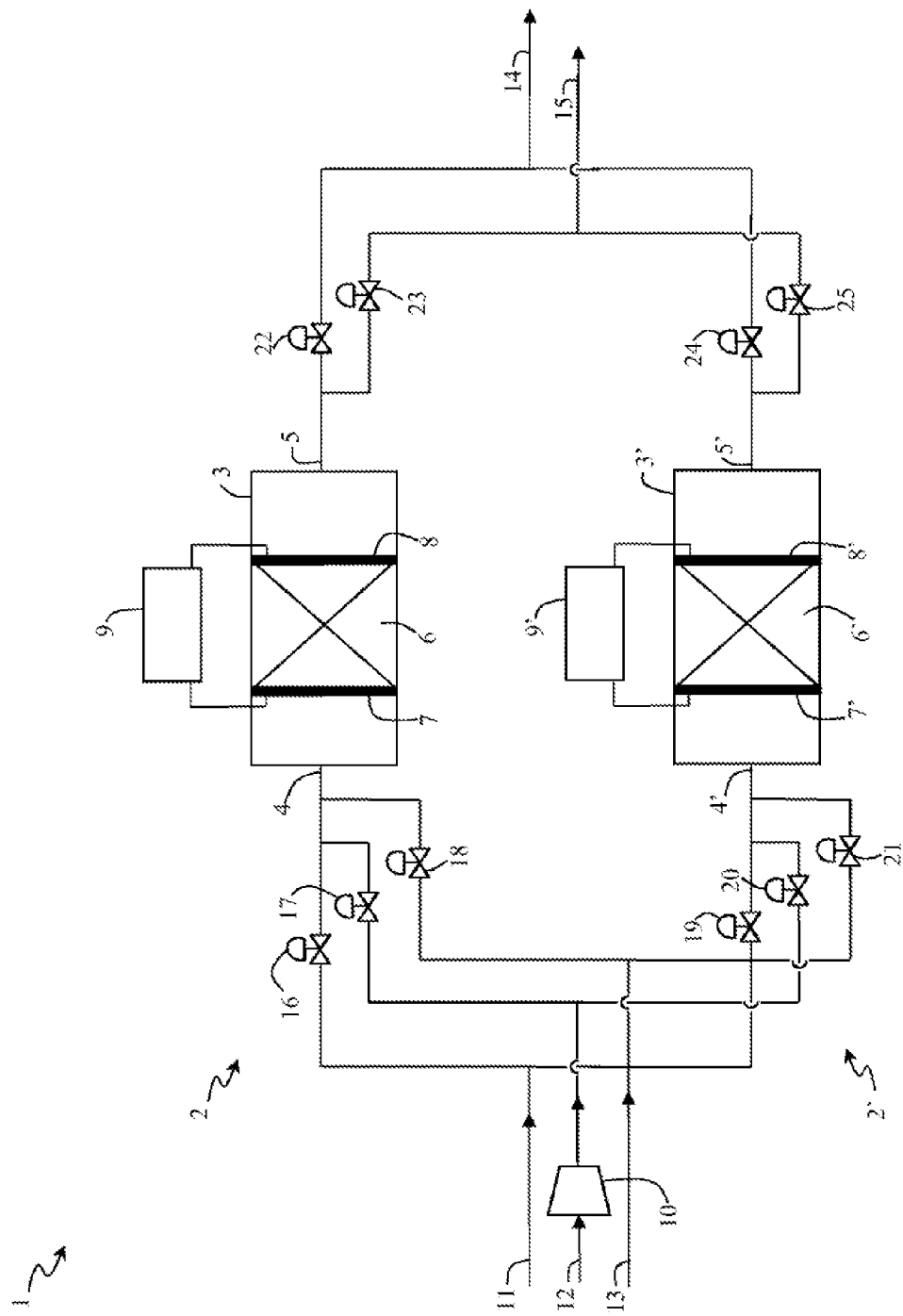
FIG. 1 illustrates an embodiment of a treatment device according to the invention.

It should be understood that, in the context of this description, the term "included between" must be interpreted as including the bounds indicated.

Furthermore, unless indicated to the contrary, the percentages expressed in the present description are percentages by volume.

The subject matter of the invention is a method for treating a biogas. In the present invention, "biogas" means a combustible gas issuing from the fermentation of organic waste of animal or plant origin in the absence of oxygen, which consists mainly of methane and carbon dioxide. It may be a biogas obtained from landfills, sewerage plants or agricultural sources.

Typically, the biogas comprises 40% to 70% methane and 60% to 30% carbon dioxide. Furthermore, the biogas may typically contain nitrogen, oxygen, water vapour, hydrogen sulphide ($H_2S$), volatile organic compounds (VOCs), polycyclic aromatic hydrocarbons (PAHs), halogenated compounds, heavy metals and siloxanes.

The biogas treated in the invention contains siloxanes that are considered to be contaminants and they are wished to be eliminated from the biogas. "Elimination of siloxanes" means in the present description a treatment for at least partly removing, preferable at least 50%, more preferably at least 70%, even more preferably at least 90%, and preferably completely, the siloxane compounds present in the biogas to be treated. The method of the present invention may advantageously be a method for eliminating siloxanes.

"Siloxanes" or "siloxane compounds" means here all the chemical compounds formed from silicon-oxygen Si—O chains or organic groups bonded to silicon atoms. Because of their particularly interesting physical and chemical properties, siloxanes are very widely used in manufacturing processes and in commercial products such as cosmetic products (creams, shampoos, etc.), cleaning and maintenance products, varnishes, resins, paints and other surface treatments, adhesives and glues, plasticised packaging, methods for oiling and treating textiles, protective equipment, electrical and electronic equipment, and medical and pharmacy parts. At the end of their life, these products and the siloxanes that they contained are often found in household and industrial waste, and then the siloxanes are found in the biogas obtained by fermentation of this waste. The concentration of siloxanes in the biogases is highly variable: studies have shown that the siloxane concentration in biogases could range from 1.6 mg/Nm³ for the lowest values recorded up to 140 mg/Nm³. Preferably, the biogas treated in the method according to the invention contains from 5 mg/Nm³ to 250 mg/Nm³ of siloxanes.

The siloxanes present in the biogases can be classified in two families: cyclic siloxanes and linear siloxanes. Among the most usual linear siloxanes are:
hexamethyldisiloxane or "L2", of formula $(CH_3)_3$—Si—O—Si—$(CH_3)_3$;
decamethyltetrasiloxane or "L4", of formula $(CH_3)_3$—Si—$[O—Si(CH_3)_2]_2$—O—Si$(CH_3)_3$;
dodecamethylpentasiloxane or "L5", of formula $(CH_3)_3$—Si—$[O—Si(CH_3)_2]_3$—O—Si$(CH_3)_3$.

Among the most usual cyclic siloxanes, there are:
hexamethylcyclotrisiloxane or "D3", of formula

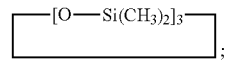

octamethylcyclotetrasiloxane or "D4", of formula

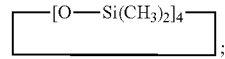

decamethylcyclopentasiloxane or "D5", of formula

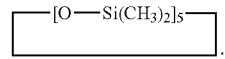

Unlike other chemical compounds that may be found in biogases, such as for example VOCs, it is particularly difficult to eliminate siloxanes since siloxanes are chemical compounds that are not very reactive.

The biogas treatment method according to the invention comprises a step (a) consisting of filtering a flow of biogas containing siloxanes with a filter made from activated-carbon cloth so as to adsorb the siloxanes in said filter.

Activated carbon is a material well known to persons skilled in the art, in particular for its uses as an adsorbant. It may be in various forms, for example in the form of granules or GAG (standing for "Granular Activated Carbon") or in the form of powder or PAC (standing for "Powdered Activated Carbon"), which are the most usual forms. Activated carbon in powder form can be used with a binder to form solid blocks. Activated carbon may also be obtained in the form of fibres, which can be used to form fabrics or felts. In the present invention, the filter is a cloth made from activated carbon or ACC (standing for "Activated-carbon cloth"). It may be chosen from woven cloths and knitted cloths. The appearance of an activated-carbon cloth is that of an ordinary cloth. The flexible structure of the activated-carbon cloth allows easy shaping. Its thickness may be between 0 nm and 5 mm, preferably between 0 mm and 2 mm and more preferably between 0 mm and 1 mm. Because of the porosity of the activated-carbon fibres and the weaving or knitting thereof, the activated-carbon cloth has a high specific surface area, preferably greater than 1000 m²/g, more preferably greater than 1500 m²/g and even more preferably greater than 2000 m²/g, measure in accordance with the BET (Brunauer-Emmett-Teller) method. The porous volume may preferably be greater than 0.3 cm³/g, more preferably greater than 0.5 cm³/g and even more preferably greater than 1.0 cm³/g. The structure is preferentially microporous, that is say provided with pores the diameter of which does not exceed 2 nanometers. The percentage of microporous volume is preferably greater than 30%, more preferably greater 50% and even more preferably greater than 75%.

Activated-carbon cloths are currently available commercially for applications such as filtration, adsorption and separation. Mention can in particular be made of woven cloths and knitted cloths available from Calgon Carbon under the name Zorflex® ACC.

Step (a) of the method according to the invention corresponds to the phase of adsorption, by the filter made from activated-carbon cloth, of the siloxanes contained in the biogas. To do this, a gaseous flow of biogas is sent to one of the faces of the filter. When the gas passes through the filter, at least some of the siloxane compounds are adsorbed by the filter. The adsorption is preferably carried out at a temperature between 0° C. and 100° C., more preferentially between 0° C. and 50° C., and even more preferentially between 0° C. and 35° C. Furthermore, the pressure of the biogas during the filtration step (a) is preferably between 0 bar and 20 bar, more preferentially between 0 bar and 10 bar, and even more preferentially between 0 bar and 1 bar (in relative pressure, compared with atmospheric pressure).

The gaseous flow collected at the discharge from the filter advantageously has a siloxane concentration of less than 2 mg/Nm$^3$, preferably less than 1 mg/Nm$^3$, and more preferentially between 0 and 0.5 mg/Nm$^3$.

The filtration step (a) is continued for a time denoted Ta, According to one embodiment, step (a) is stopped after a previously defined time and Which preferably corresponds to the saturation of the filter. According to another embodiment, the siloxane concentration is measured continuously in the gaseous stream collected at the discharge from the filter. Step (a) may be stopped when the siloxane concentration measured exceeds a previously defined threshold, preferably approximately 5 mg/Nm$^3$, more preferentially approximately 3 mg/Nm$^3$, and even more preferentially approximately 1 mg/Nm$^3$. The time Ta is preferably between 1 hour and 24 hours, and more preferably between 8 hours and 24 hours.

The biogas treatment method according to the invention further comprises a step (b1) consisting of regenerating said filter. This step (b1) corresponds to the phase of desorption of the siloxanes by the activated-carbon cloth filter. Unlike filters consisting of activated-carbon powder and granules, a filter made from activated-carbon cloth is a good electrical conductor. It is therefore possible to circulate an electric current in the filter. Preferably, the filter is connected to two electrodes and connected to an electrical generator. Preferably, a continuous electric current is applied to the filler. The circulation of the electric current in the filter creates heat by the Joule effect.

Simultaneously with the passage of the electric current, the filter is subjected to a flushing gaseous flow. To do this, a flushing gaseous flow is sent to one of the faces of the filter. The flushing gas is preferably chosen from the group consisting of air, depleted air, an inert gas such as nitrogen or carbon dioxide, methane or an already treated biogas. Highly preferably, the flushing gas is air. The flushing gaseous flow during step (b1) can pass either in the same direction or in the opposite direction with respect to the passage of the biogas during step (a). The flushing gas may itself be heated in order to maintain or accelerate the heating of the filter. If the gas is not heated, its flow rate is optimised in order not to cool the filter, Optionally, the treatment method also comprises a step (b2) of thermal destruction of the flushing gas used at step (b1). The destruction of the flushing gas, because of its low flow rate, may be carried out by a very lean gas burner, requiring only between 1% and 10% by volume of methane, preferably between 1% and 6%, and even more preferentially between 1% and 3%, for auto-thermal functioning.

In the case of regeneration of the filter by indirect heating by hot air, as conventionally used, flow rates of hot air of 100-500 m$^3$/hour which may be as high as 1000 m$^3$/hour, are necessary. Destruction of this hot air then requires much greater volumes of methane, in particular through the use of a more conventional burner that consumes approximately 10% to 15% by volume of methane. In the case of the invention, the combination of steps b1) and b2) is therefore thereby economically very advantageous.

According to another possible embodiment, the flushing gas may also be destroyed by a regenerative or non-regenerative thermal oxidation system. The impurities of the siloxane type are preferably oxidised at high temperatures, typically from 800° to 850° C. or even more for a period of 1 to 2 seconds, before discharge to atmosphere.

When the flushing gas passes through the heated filter, at least some of the siloxane compounds adsorbed in the filter are desorbed. The desorption is preferably carried out at a temperature of between 100° C. and 300° C., more preferentially between 150° C. and 300° C., and even more preferentially between 200° C. and 300° C. Furthermore, the pressure of the flushing gas during the regeneration step (b1) is preferably between 0 bar and 1 bar, more preferentially between 0 bar and 0.5 bar, and even more preferentially between 0 bar and 0.2 bar (in relative pressure, compared with atmospheric pressure).

The inventors found that regenerating a filter made from activated-carbon cloth through the combined action of heating by the Joule effect and gaseous flushing afforded effective desorption of the compounds contaminating the filter with less expenditure of energy than the known methods of the prior art. This is because heating by the Joule effect is a direct heating method that consumes less energy than conventional indirect heating by a hot flushing flow. Furthermore the activated-carbon cloth filter is particularly suitable for this heating technique because of its good electrical conduction. Finally, gaseous flushing affords more rapid elimination of the desorbed compounds without making the method and device complex, unlike techniques using a vacuum. Unlike the methods of the prior art, air may advantageously be used as a flushing gas for reasons of cost and simplicity, without risking damaging the activated-carbon cloth filter because of the temperature necessary for the desorption of the siloxane compounds. Filters using an activated-carbon cloth as an adsorbent material have a significantly smaller size compared with a conventional solution using activated carbon in grains. This reduction in size is in particular due to a higher adsorption capacity. Moreover, the adsorption and desorption speeds of filters using an activated-carbon cloth as the adsorbent material are greater than those of conventional filters. These greater speeds also contribute to a reduction in the quantity of material necessary for treating a constant flow. It is possible to reduce the flow rate of flushing gas. The optional removal or destruction of this gas is then simpler. The overall size of the equipment may be reduced, which may reduce investment cost. Another advantage of the method according to the invention is that it does not give rise to a phenomenon of chemical recombinations of certain silanols and/or siloxanes, namely in particular trimethylsilanol (TMS), which may be transformed into hexamethyldisiloxane (L2) by condensation. These recombinations may give rise to significant and unpredictable release. The absence of these recombinations significantly increases the efficacy and robustness of the biogas treatment method according to the invention.

The regeneration step (b1) is continued for a time denoted Tb. According to one embodiment, the step (b1) is stopped at the end of a previously defined time and which preferably corresponds to the maximum regeneration of the filter. According to another embodiment, the siloxane concentration is measured continuously in the flushing gaseous stream collected at the discharge from the filter. Step (b1) can be stopped when the siloxane concentration measured passes below a previously defined threshold. The time Tb of the regeneration step is preferably less than the time Ta of the adsorption step. The time Tb is preferably between 1 hour and 16 hours, and more preferably between 1 hour and 8 hours.

At the end of the regenerating step (b1) the filter can be used in a new filtration step (a). However, according to a preferred embodiment of the invention, the treatment method also comprises a step (c), after step (b1) and before an optional new step (a). This step (c) consists of rinsing the filter by subjecting it to a methane flow devoid of siloxanes. According to a highly preferred embodiment, this methane flow devoid of siloxane, also referred to as a rinsing gas, may be biogas that was previously treated by the method according to the invention. However, it is possible to use other gaseous sources provided that the gas is rich in methane, or even consists of methane, and does not contains siloxanes, This rinsing step (c) is particularly useful in the case where the flushing gas used in step (b1) is air. It makes it possible to dry out the air present in the filter and to replace it with methane. Thus, when a new filtration step (a) is resumed, the treated gas obtained at the start of the filtration is not contaminated by the remainders of the flushing gas, in particular air. Furthermore, during this rinsing step (c), it is possible to cool the filter to a temperature compatible with the adsorption step (a).

The passage of the rinsing gaseous stream during step (c) can be effected in the same direction as or in the opposite direction to the passage of the biogas during step (a), and in the same direction as or in the opposite direction to the passage of the flushing gas during step (b1).

The rinsing step (c) is continued for a time denoted Tc. According to one embodiment, step (c) is stopped at the end of a previously defined time, According to another embodiment, the concentration of flushing gas, for example air, is measured continuously in the gaseous stream collected at the discharge from the filter. Step (c) can be stopped when the concentration of flushing gas measured passes below a previously defined threshold. Alternatively or in addition the temperature of the filter may be measured continuously. Step (c) can be stopped when the temperature of the filter passes below a previously defined threshold. The rinsing gas recovered at the end of step (c) may also be destroyed, in the same way as the flushing gas at step (b2).

The biogas treatment method according to the invention may be a cyclic method, each cycle comprising a filtration step (a) and then a regeneration step (b1), optionally followed by a rinsing step (c). The steps may be concatenated directly one after the other or stop times may be provided between steps. Since a cyclic method cannot treat a continuous flow of incoming gas, it is possible to use a plurality of treatment devices functioning in parallel, at least one device being in the filtration phase when another device is in the regeneration or rinsing phase or at rest.

According to a particular embodiment, the treatment method may be implemented in a unit having two parallel treatment devices. A filtration step (a) may be carried out in the treatment device. After a period Ta, the filtration step (a) is stopped in the first device and commences in the second treatment device. During the period of the filtration step in the second device, the first device is subjected to the regeneration step (b1) for a time Tb, and then optionally to the rinsing step (c) for a time Tc. If, at the end of the regeneration step (b1) or optionally of the rinsing step (c), the filtration step (a) in the second device has not ended, the first device is stopped. Finally, when the filtration step (a) has ended in the second device, it recommences in the first device, and the second device can in its turn be regenerated.

Another subject matter of the invention is a device intended to implement the method described above. This device for treating a biogas containing siloxanes comprises:
    a filtration chamber provided with at least a first orifice enabling gas to enter and at least a second orifice enabling gas to emerge;
    a filter made from activated-carbon cloth placed in said filtration chamber and connected to two electrodes;
    a means for circulating an electric current in said filter made from activated-carbon cloth connected to said two electrodes;
    a means for injecting flushing gas into the filtration chamber,
    and optionally a means for destroying the flushing gas emerging from the filtration chamber.

The filtration chamber and the elements situated inside are preferably constructed from materials withstanding the highest temperatures used, in particular during the regeneration step (b1). It is not necessary for these installations to be provided for work under vacuum. The shape and sizing of the filtration chamber may vary in particular according to the flow rate of biogas to be treated and the concentration of siloxane compounds to be eliminated. Preferably, the filtration chamber is cylindrical. This type of shape is advantageous since it makes it possible to obtain homogeneous gaseous flows over the whole filter.

The filtration chamber is provided with at least a first orifice enabling gas to enter. According to the step of the treatment method used, the nature of the gas entering the chamber varies: biogas during step (a), flushing gas in step (b1) and optionally rinsing gas in step (c). They may enter through the same orifice connected to a plurality of supply lines provided with valves. Alternatively, each gas supply line may open onto its own orifice in the filtration chamber. Furthermore, an inlet orifice for one gas may be an outlet orifice for another and vice versa.

The filtration chamber is also provided with at least a second orifice enabling gas to emerge. According to the step of the treatment method used, the nature of the gas emerging from the chamber varies: biogas treated during step (a), flushing gas in step (b1) and optionally rinsing gas in step (c). They may emerge through the same orifice connected to a plurality of lines provided with valves or through a plurality of different orifices. Highly preferably, the treated biogas recovered during step (a) is conducted into a downstream storage device, or into another treatment device, for example for eliminating $CO_2$ for producing biomethane or biofuel, or into an apparatus consuming the biogas as a fuel, for example cogeneration engines producing electricity and heat. At the discharge from the filtration chamber, the treatment device optionally comprises a means for destroying the flushing gas recovered during step (b1) and optionally the rinsing gas recovered during step (c), for example a torch or a regenerative or non-regenerative thermal oxidation system.

The filtration chamber contains at least one filter made from activated-carbon cloth. The shape, sizing and number of filters placed in a filtration chamber may vary in particular according to the flow rate of biogas to be treated and the concentration of siloxane compounds to be eliminated. When the filtration chamber has a cylindrical shape, the filter may be coiled or folded. To enable the regeneration step (b1) of the treatment method to be implemented, the filter is connected to at least two electrodes, and the device comprises a means for circulating an electric current in the filter made from activated-carbon cloth connected to said two electrodes. Preferably, the shape of the filter and the positioning of the electrodes allows homogeneous heating of the filter by the Joule effect.

Finally, to enable the regeneration step (b1) of the treatment method to be implemented, the device comprises a means for injecting flushing gas into the filtration chamber. This means may consist for example of a blower.

According in particular to the flow rate of biogas to be treated, the treatment unit may comprise a plurality of filtration chambers disposed in parallel. In addition, to ensure continuous treatment of a flow of biogas, a plurality of treatment devices as described above may be disposed in parallel in order to constitute together a treatment unit with continuous functioning. Another subject matter of the invention is therefore a treatment unit comprising a plurality of treatment devices as defined above disposed in parallel in order to function continuously.

The invention is now described in more detail and non-limitatively with reference to a particular embodiment depicted in FIG. 1.

FIG. 1 depicts a treatment unit 1 comprising two devices 2 and 2' disposed in parallel. Each device 2, 2' comprises:
- a filtration chamber 3, 3' provided with at least a first orifice 4, 4' allowing the entry of gas and at least a second orifice 5, 5' allowing the discharge of gas;
- a filter made from activated-carbon cloth 6, 6' placed in said filtration chamber 3, 3' and connected to two electrodes 7, 7', 8, 8';
- a means 9, 9' for circulating an electric, current in said filter 6, 6' made from activated-carbon cloth connected to said two electrodes;
- a means 10 for injecting a flushing gas into the filtration chamber 3, 3', Furthermore, the processing unit 1 is provided with a pipe supplying biogas to be treated 11, a pipe for supplying flushing gas 12, which is preferably air, and a pipe supplying rinsing gas 13 that is preferably biogas previously treated in the unit. Each supply pipe is divided in order to supply the two devices 2, 2', and valves 16, 17, 18, 19, 20 and 21 are placed on the supply pipes in order to select the gaseous flows to be introduced into the two devices. At the discharge, the processing unit 1 is provided with a pipe discharging treated biogas 14 and a pipe discharging the other gaseous effluents 15, in particular the flushing gas used and the rinsing gas used. Each discharge pipe collects the effluents from the two devices 2 and 2', and valves 22, 23, 24 and 25 are placed on the discharge pipes.

Figure 2:
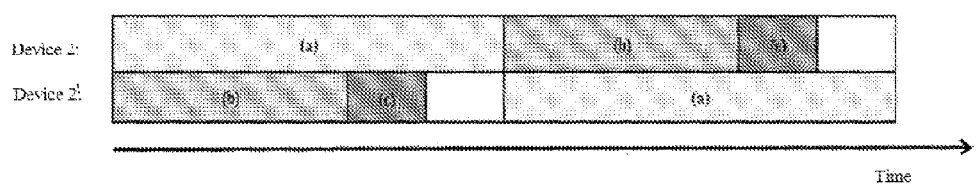
FIG. 2 illustrates schematically a cyclic treatment program that can be implemented on the device depicted in FIG. 1.

When the biogas treatment method that is the subject matter of the invention is implemented, the treatment unit 1 may be operated in accordance with the scheme depicted in FIG. 2: this shows the succession of treatment cycles in parallel on the devices 2 and 2'. The relative durations of the steps are given only by way of example.

In FIG. 2, the device 2 commences with a filtration step (a). For this purpose, the valves 16 and 22 are open while the valves 17, 18 and 23 are closed. The filtration chamber 3 is supplied with biogas arriving through the pipe 11. Passing through the filter 6, the contaminating siloxane compounds are adsorbed. The treated biogas is recovered at the discharge from the chamber 3 via the pipe 14. Step (a) is carried out for a period Ta.

When step (a) has ended, the valves 16 and 22 are closed. The treatment cycle continues immediately with a step (b1) of regenerating the filter 6. For this purpose, the valves 17 and 23 are open. A continuous electric current is circulated in said filter 6 connected to the electrodes 7 and 8 by means of the current generator 9. By the Joule effect, the filter 6 heats up. An air flow is employed as a flushing gas. It is introduced into the filtration chamber 3 through the supply pipe 12 by means of a blower 10. Under the effect of the heating and flushing, the siloxane contaminants are desorbed from the filter 6 and the flushing gas used is discharged through the pipe 15. Step (b1) is carried out for a period Tb, at the end of which the filter 6 is considered to be regenerated.

When step (b1) has ended, the valve 17 is closed and the electric current passing through the filter 6 is stopped. The treatment cycle continues immediately with a step (c) of rinsing the filter 6. This is because, at the end of step (b1), the filter 6 and the filtration chamber 3 contain air. To prevent air entering the biogas at the time when the filter 6 once again goes into a filtration phase, it is preferable to discharge the air. For this purpose, the valve 18 is opened. A flow of previously treated biogas, coming for example from the line 14, is introduced into the filtration chamber 3 through the supply pipe 13. The rinsing gas used, containing air, is discharged through the pipe 15. Step (c) is carried out for a period Tc.

At the end of step (c), the valves 18 and 23 are closed. The device 2 is ready to recommence a filtration phase (a) once again. In the cycle described in FIG. 2, the device 2 is stopped for a sufficient time for the phase (a) to end on the device 2', that is to say for a period $T_{stop}$ such that $T_{stop}$=Ta−Tb−Tc.

The device 2' is operated in the same way as the device 2 by means of valves 19, 20, 21, 24 and 25, but with an offset in the times of the phases. Thus, when the device 2 commences a filtration phase (a), the device 2' commences a regeneration phase (b1), and When the device 2 ends the filtration phase (a) to pass to the regeneration phase (b1), it is the device 2' that commences a filtration phase (a). In this way, one of the two devices is permanently in a filtration phase (a), which ensures continuous treatment of the biogas arriving through the supply pipe 11.

EXAMPLES

Example 1

The activated-carbon cloth used is the one sold by the company Carbon Cloth International under the name Zorflex® Knitted Cloth FM30K.

Samples of activated-carbon cloth previously dried in an oven were loaded with siloxanes in a static reactor. For this purpose, the required siloxane compound was introduced into the reactor in liquid form in order to saturate the atmosphere inside the reactor. The samples were thus confined for 24 hours.

Approximately 20 mg of cloth loaded with siloxane was sampled and introduced into a thermogravimetric analyser (SETSYS Evolution or TG-DSC 111 from Setaram). Each sample was subjected to a temperature gradient of 10° C. per minute between 20° C. and 105° C., and then to a level step of 105° C. for 30 minutes in order to desorb the water contained in the pores of the cloth, and finally to a temperature gradient of 10° C. per minute up to 300° C. The variation in the mass of the sample was measured by means of a microbalance. The variation in the mass as a function of time was studied as a function of temperature. The desorption temperature is taken at the maximum desorption rate.

The following table 1 presents the results obtained for various siloxanes:

TABLE 1

| Siloxane | Boiling point (° C.) | Maximum desorption rate temperature (° C.) | Desorption rate (mg·g$^{-1}$·min$^{-1}$) |
|---|---|---|---|
| Hexamethyldisiloxane | 101 | 110 | −7.9 |
| Decamethyltetrasiloxane | 194 | 180 | −4.2 |
| Dodecamethylpentasiloxane | 230 | 200 | −5.2 |
| Octamethylcyclotetrasiloxane | 175 | 170 | −5.8 |
| Decamethylcyclopentasiloxane | 211 | 200 | −5.3 |

It is found that the temperatures at which the desorption rate is greatest are between 110° C. and 200° C. The desorption rates are all of the same order of magnitude, lying between 4 mg·g$^{-1}$·min$^{-1}$ and 8 mg·g$^{-1}$·min$^{-1}$. These data make it possible to design and size the treatment system.

Example 2

The gaseous flows inside a cylindrical filtration chamber provided with a coiled filter were modelled with the following parameters:
biogas supply: 500 Nm$^3$/hour
filtration passage surface area: 1.54 m$^2$.

Figure 3:
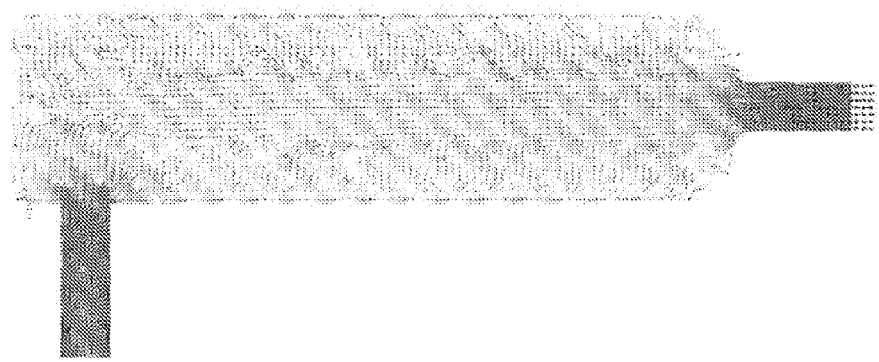
FIG. 3 depicts the distribution of the velocity of the gaseous flows inside a filtration chamber obtained by modelling.

The distribution of the velocity of the gaseous flows is depicted in FIG. 3: the white corresponds to a velocity of 0 m/s, and then, the higher the velocity, the darker the colour, until black, which corresponds to a velocity of 20 m/s.

It is seen clearly in this FIG. 3 that the velocities are homogeneous in the whole of the filtration chamber.

Example 3

The treatment device comprises two filters in parallel, each filter being a circular filter 30 centimeters in diameter and 75 centimeters long. This filter consists of 20 layers of Zorflex FM 30 K activated-carbon cloth (Calgon Carbon).

The biogas treated in this example comes from a sewerage works at a flow rate of 500 Nm$^3$/hour, and contains siloxanes at a concentration of 100 mg/Nm$^3$. The linear velocity of the biogas for this filtration passage surface area is 20 cm/s and the pressure drop amounts to 4 mbar. The pressure of the biogas at the entry is 0.1 bar (relative pressure).

The filtration step (a) is conducted for a period Ta of one hour, at an adsorption temperature of 35° C. The concentration of siloxanes at the discharge from the treatment device is less than 0.1 mg/Nm$^3$.

The regeneration step (b1) is conducted for a period Tb of 15 minutes, at a temperature of 250° C. An air flow at a pressure of 0.05 bar (relative pressure) is used as a flushing gas.

Example 4

This example describes the optional step (b2) of thermal destruction of the flushing gas at the discharge from the filtration chamber. More precisely, it illustrates the difference in biogas consumption necessary for regenerating the filter, that is to say for burning the flushing gas, between a regeneration method using heating by the Joule effect combined with a flushing gaseous flow (the case of the present invention) and a regeneration method using solely a hot air flow, without the Joule effect.

Regeneration by Heating by the Joule Effect Combined with a Flushing Gaseous Flow The flushing gaseous flow to be eliminated comes from a biogas treatment test in accordance with example 3 above. Unlike example 3, the flushing gaseous flow is a flow of depleted air (approximately 10% oxygen by volume) flowing at a rate of 25 m$^3$/hour. This flow is next destroyed at the discharge from the filtration chamber, by a very lean gas burner (of the FLOX® type with flame-free oxidation), which functions with a methane concentration of 2.5% by volume. The raw biogas containing 60% methane, the volume of raw biogas to be added for the functioning of the burner is 1.1 m$^3$/hour. Over one day, the filter is regenerated 12 times with a regeneration time of 30 minutes. The total biogas consumption for the regeneration is therefore 6.4 m$^3$/day.

Regeneration Solely by Hot Air Flow

A regeneration method using solely hot air requires a regeneration flow rate of 250 m$^3$/hour. The hot air flow is then destroyed by a lean gas burner that functions with a methane concentration of 12.5% by volume. The raw biogas containing 60% methane, the volume of raw biogas to be added for the functioning of the burner is 59.5 m$^3$/hour. Over one day, the filter is regenerated only once with a regeneration time of 2.5 hours. The total consumption of biogas for regeneration is therefore 148.8 m$^3$/day.

The daily consumption of biogas is therefore reduced by a factor of 23, which represents a not insignificant economic advantage for the user.

The invention claimed is:

1. Method for treating a biogas containing siloxanes, comprising the following steps:
   a) filtering a flow of biogas containing siloxanes with a filter made from activated-carbon cloth so as to adsorb the siloxanes in said filter, then
   b1) regenerating said filter by circulating an electric current in said filter subjected to a flushing gaseous flow, then
   b2) optionally destroying said flushing gas thermally,
   (c) rinsing the filter by subjecting it to a flow of methane containing no siloxanes, wherein, during step (c), the concentration of flushing gas is measured continuously in the gaseous flow collected at the discharge from the filter and the temperature of the filter is measured continuously, and step (c) is stopped when:
   the concentration of flushing gas measured passes below a previously defined threshold, and
   the temperature of the filter passes below a previously defined threshold.

2. Method according to claim 1, wherein the concentration of siloxane is measured continuously in the gaseous flow collected at the discharge from the filter during step (a), and step (a) is stopped when the siloxane concentration measured exceeds a previously defined threshold.

3. Method according to claim 1, wherein the flushing gas during step (b1) is air.

4. Method according to claim 1, wherein the regeneration phase (b1) is carried out at a temperature between 100° C. and 300° C. and the relative pressure of the flushing gas during step (b1) is between 0 bar and 1 bar.

5. Method according to claim 1, wherein said flow of methane devoid of siloxane is biogas that was previously treated by the method for treating a biogas containing siloxanes, comprising the following steps:
 a) filtering a flow of biogas containing siloxanes with a filter made from activated-carbon cloth so as to adsorb the siloxanes in said filter, then
 b1) regenerating said filter by circulating an electric current in said filter subjected to a flushing gaseous flow, then
 b2) optionally destroying said flushing gas thermally.

6. Device for treating a biogas containing siloxanes intended for implementing the method as defined in claim 1, the device comprising:
 a filtration chamber provided with at least a first orifice allowing entry of gas and at least a second orifice allowing the discharge of gas;
 a filter made from activated-carbon cloth placed in said filtration chamber and connected to two electrodes;
 a means for circulating an electric current in said filter made from activated-carbon cloth connected to said two electrodes;
 a means for injecting flushing gas into the filtration chamber;
 a pipe supplying biogas to be treated;
 a pipe for supplying flushing gas;
 a pipe supplying rinsing gas,
 and optionally a means for destroying the flushing gas emerging from the filtration chamber.

7. Treatment unit comprising a plurality of treatment devices as defined in claim 6 disposed in parallel so as to function continuously.

8. Method according to claim 2, wherein the previously defined threshold is approximately 5 mg/Nm$^3$.

9. Method according to claim 2, wherein the previously defined threshold is approximately 3 mg/Nm$^3$.

10. Method according to claim 2, wherein the previously defined threshold is approximately 1 mg/Nm$^3$.

11. Method according to claim 1, wherein the regeneration phase (b1) is carried out at a temperature between 100° C. and 300° C.; and the relative pressure of the flushing gas during step (b1) is between 0 bar and 0.5 bar.

12. Method according to claim 1, wherein the regeneration phase (b1) is carried out at a temperature between 100° C. and 300° C.; and the relative pressure of the flushing gas during step (b1) is between 0 bar and 0.2 bar.

13. Method according to claim 1, wherein the regeneration phase (b1) is carried out at a temperature between 150° C. and 300° C.; and the relative pressure of the flushing gas during step (b1) is between 0 bar and 1 bar.

14. Method according to claim 1, wherein the regeneration phase (b1) is carried out at a temperature between 150° C. and 300° C.; and the relative pressure of the flushing gas during step (b1) is between 0 bar and 0.5 bar.

15. Method according to claim 1, wherein the regeneration phase (b1) is carried out at a temperature between 150° C. and 300° C.; and the relative pressure of the flushing gas during step (b1) is between 0 bar and 0.2 bar.

16. Method according to claim 1, wherein the regeneration phase (b1) is carried out at a temperature between 200° C. and 300° C.; and the relative pressure of the flushing gas during step (b1) is between 0 bar and 1 bar.

17. Method according to claim 1, wherein the regeneration phase (b1) is carried out at a temperature between 200° C. and 300° C.; and the relative pressure of the flushing gas during step (b1) is between 0 bar and 0.5 bar.

18. Method according to claim 1, wherein the regeneration phase (b1) is carried out at a temperature between 200° C. and 300° C.; and the relative pressure of the flushing gas during step (b1) is between 0 bar and 0.2 bar.

* * * * *